United States Patent
Liu et al.

(10) Patent No.: US 6,503,201 B1
(45) Date of Patent: Jan. 7, 2003

(54) CORRECTION OF EXTENDED FIELD OF VIEW IMAGES FOR DISTORTION DUE TO SCANHEAD MOTION

(75) Inventors: Lingnan Liu, Mill Creek, WA (US); Lars Jonas Olsson, Woodinville, WA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/970,531

(22) Filed: Oct. 3, 2001

(51) Int. Cl.[7] .................................................. A61B 8/00
(52) U.S. Cl. ........................................................ 600/443
(58) Field of Search ................................. 600/437, 443, 600/447; 128/916; 73/626; 367/7; 382/128

(56) References Cited

U.S. PATENT DOCUMENTS

| | | | |
|---|---|---|---|
| 5,538,004 A | * | 7/1996 | Bamber ....................... 128/916 |
| 5,566,674 A | | 10/1996 | Weng |
| 5,575,286 A | | 11/1996 | Weng et al. |
| 5,782,766 A | | 7/1998 | Weng et al. |
| 5,899,861 A | | 5/1999 | Friemel et al. |
| 5,910,114 A | | 6/1999 | Nock et al. |
| 6,014,473 A | * | 1/2000 | Hossack et al. ............. 600/443 |
| 6,190,321 B1 | * | 2/2001 | Pang et al. .................. 600/441 |
| 6,238,345 B1 | | 5/2001 | Wissler et al. |
| 6,306,091 B1 | * | 10/2001 | Sumanaweera et al. ..... 600/443 |
| 6,352,508 B1 | * | 3/2002 | Pang et al. .................. 600/443 |
| 6,364,835 B1 | * | 4/2002 | Hossack et al. ............. 600/443 |

* cited by examiner

Primary Examiner—Francis J. Jaworski
(74) Attorney, Agent, or Firm—W. Brinton Yorks, Jr.

(57) ABSTRACT

Extended field of view (panoramic) ultrasonic images can exhibit dimensional distortion due to the interplay of the direction and speed of scanhead motion and the direction and rate of beam scanning. This distortion can result in measurement inaccuracies when making measurements of anatomy or distances in the panoramic image. This distortional inaccuracy is compensated by adjusting the alignment of elemental images as they are aligned to produce the panoramic images in consideration of the estimated amount of distortion. The technique can be applied to either linear or curved array transducers and to linear or sector scan formats.

29 Claims, 2 Drawing Sheets

CORRECTION OF EXTENDED FIELD OF VIEW IMAGES FOR DISTORTION DUE TO SCANHEAD MOTION

This invention relates to ultrasonic diagnostic imaging systems and, in particular, to ultrasonic diagnostic imaging systems which produce extended field of view images.

One form of ultrasonic imaging which has reappeared after a long absence from clinical ultrasonic imaging is the use of compound imaging to create images over an extended length of anatomy. For example, this form of compound imaging, termed panoramic or extended field of view (XFOV) imaging, can be used to produce an image of a blood vessel extending the full length of the leg. But instead of using a single piston transducer to build up such an image line by line, the current techniques use array transducers which produce two dimensional images. The array transducer is moved parallel to the image plane with the anatomy of interest captured in the plane. A succession of two dimensional images are then pieced together to form the XFOV image by aligning the images through two dimensional image correlation, MSAD processing, feature matching, mutual information, and/or other image matching techniques.

One problem which has been recognized in this form of XFOV imaging is the image distortion that occurs due to the scanning direction of each image plane in conjunction with the motion of the scanhead. This distortion can result in a laterally stretched image when the scanhead is moving in the lateral scanning direction, and a laterally compressed image when the direction of scanhead motion and beam scanning oppose each other. While this distortion is not very apparent in an XFOV image, it does become a problem when quantified images are needed, that is, when a measurement is to be made of the anatomical structure in an XFOV image. The distortion can cause a measurement along the length of the image, generally a significant dimension of the anatomy under study in an XFOV image, to be in error by upwards of 10%, depending on scanning speed. A 60 cm measurement can be in error by more than 6 cm.

An approach to correcting this error is to "warp" the image in consideration of these effects back to its correct appearance. A rigorous approach for doing this is found in U.S. Pat. No. 5,910,114. As this patent illustrates, these error sources can be is determined then used to correct every pixel in an image. The correction technique can be applied to a conventional B mode image, or to an elemental image that is going to be used in an XFOV image. However, this intensive correction approach required extensive computation, making the approach difficult and expensive to provide in a real time imaging system. It is preferable to be able to correct this motional error in XFOV imaging without having to resort to expensive or complex computational systems.

In accordance with the principles of the present invention, the spatial lateral error in XFOV images is corrected by estimating the distortional error in an image from knowledge of the scanhead motion and the beam scanning rate and direction. The error is then accounted for when two or more images are aligned to form an XFOV image. Instead of having to perform a complex computation for each pixel, the error is offset in a single step during the image alignment process. While individual segments of the XFOV image may still retain distortion, the size of the image available for measurement has been compensated so that the lateral dimension of the XFOV image is substantially accurate. This correction technique provides quantifiably diagnostic XFOV images without the need for intensive and time-consuming computational processing.

Figure 1:
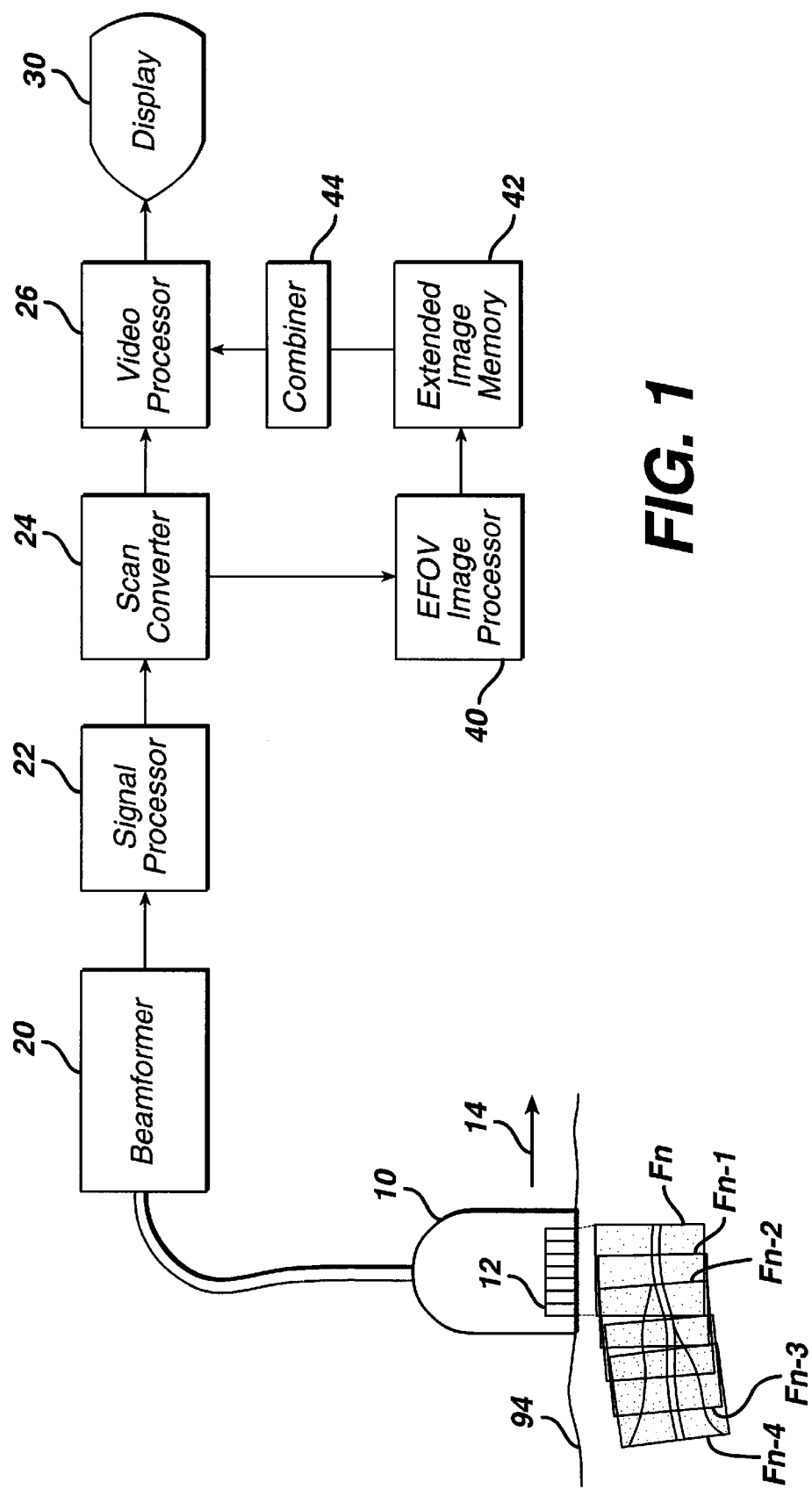
FIG. 1 illustrates in block diagram form an extended field of view ultrasonic imaging system.

In extended field of view imaging, an ultrasonic scanhead is moved along the skin in line with the image plane of the transducer. As it moves a series of images are automatically acquired of the anatomy below the path of travel. These images are aligned and combined to form a composite image of the anatomy below the path of travel. To scan a length of a blood vessel, for instance, the clinician slides the scanhead in the direction 14 as shown in FIG. 1, which denotes a direction co-aligned with the longitudinal axis of the array transducer 12 of the scanhead 10 and the plane of an image Fn. As the scanhead is moved in the direction 14, successive planar images referred to herein as elemental images are acquired, each being slightly displaced (as a function of the speed of scanhead motion and the image acquisition rate) in the direction 14 from the previous image. The displacement between successive elemental images is computed and the images are registered and combined on the basis of the displacements to produce a composite extended field of view image of the blood vessel beneath the path of travel of the scanhead.

Ideally, it is desirable for the scanhead to be translated at a constant speed while images are acquired, so that individual elemental images are not stretched or compressed laterally relative to earlier acquired elemental images. However, compression or stretching in an absolute sense relative to the true dimensions of the anatomy will occur, due to the fact that an image plane is not acquired instantaneously, but is formed of scanlines transmitted sequentially from the transducer to scan an image plane. If the sequence of beam scanning from one end of the transducer to the other is in the direction of scanhead motion the actual dimensions of the image will be stretched. If the beam scanning sequence is opposite the direction of scanhead travel the dimensions of the image will be compressed. Measurements made on the XFOV image will thus be inaccurate as a function of the magnitude of the stretching or compression. It is an object of the present invention to address this spatial accuracy problem.

An ultrasonic diagnostic imaging system for producing extended field of view images in accordance with the principles of the present invention is shown in FIG. 1. The scanhead 10 is moving in the direction 14 of the planes of successively acquired images $F_{n-4}$–$F_n$. The acquired images $F_{n-4}$–$F_n$ are transparently shown in this drawing so that their spatial overlap can be appreciated. The first image acquired in this sequence is image frame $F_{n-4}$, and the last image acquired is frame $F_n$, shown in alignment with the aperture of the array transducer 12. The echoes of each acquired image frame are formed into beams by beamformer 20. The coherent echoes are then processed by a signal processor 22 and arranged in respective ultrasonic images by a scan converter 24. To form conventional real time images, each image is coupled to a video processor 26 and displayed on an image display 30.

In accordance with the principles of the present invention, each image is coupled to an XFOV image processor 40. The XFOV image processor, which may, operate with either estimate data (pre-scan converted) images or display data (scan converted pixel data) images, receives each newly acquired image during the XFOV mode of operation and computes the displacement between the new image and the previously acquired elemental image of the EFOV image, as more fully described in U.S. Pat. No. 6,238,345, the contents of which are incorporated herein by reference. The XFOV image processor stores the new image in registration with the previously acquired elemental images in an extended image memory 42, the preferred form of which is a history buffer as shown and described in the '345 patent. Each time the XFOV image is extended by the addition of new image data, the XFOV image data stored in the history buffer is extracted from the memory and combined by a combiner 44 to form a new XFOV image, which is coupled to the video processor 26 for viewing on the display. Thus, the clinician is able to follow in real time the progress of the XFOV image as it is built up during the course of scanhead motion along the body.

Figure 2A:
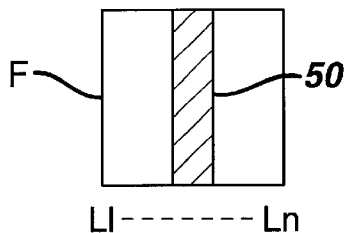
FIG. 2a illustrates a rectilinear ultrasound image frame which is to be used in an extended field of view image.

FIG. 2a illustrates an elemental image frame F used in an XFOV image. The frame F is drawn rectangular to connote the use of a beam scanning sequence in which all of the beams are transmitted in parallel, as is the case of scanning with a linear array transducer. In this example the beams scan the image area from left to right, starting with a beam for image line L1 and ending with a beam for image line Ln. When one image frame is scanned the sequence repeats to scan lines L1–Ln for another image frame.

Figure 2B:
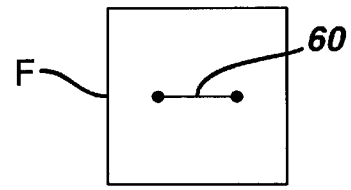
FIG. 2b illustrates a line on the image frame of FIG. 2a along which motional distortion is to be measured.
Figure 3:
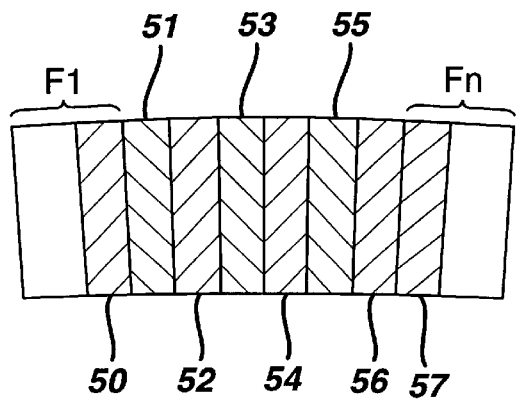
FIG. 3 illustrates an arrangement of elemental rectilinear ultrasound image frames which form an extended field of view image.
Figure 4:
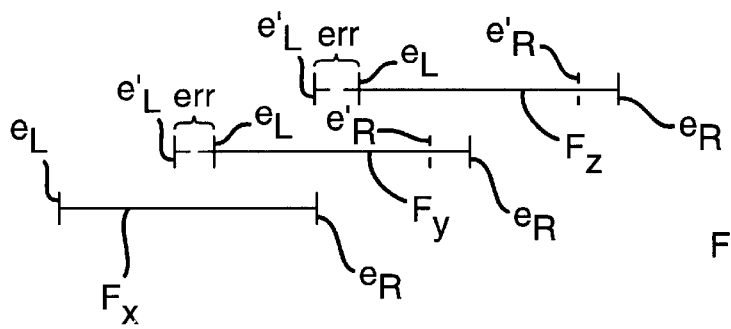
FIG. 4 illustrates the correction of frame alignment in accordance with the principles of the present invention to adjust for distortion in the extended field of view image due to relative beam scanning and scanhead motion.

In a constructed embodiment of the present invention only a central area 50 of the entire image frame is used in the XFOV image; the image area on either side of the central area 50 is not used in the XFOV image. This is because resolution is generally best in the central region of the image, unaffected by fringe effects at the extreme ends of the image. There is also less distortion over a narrower image area than there would be over the full image width. The only exception to this rule are the first and last frames at the beginning and end of the XFOV image, where the portion of the image frame to the left of the central area (in the case of the first image frame F1 as shown in the XFOV image of FIG. 3) and the portion of the image frame to the right of the central area (in the case of the last image frame Fn as shown in FIG. 3) are used. At the beginning and end of the XFOV image the scanhead is generally at rest, either because it has not yet moved (in the case of frame F1) or has come to rest (in the case of frame Fn) and hence these frames exhibit little or no distortion due to motion. Between the ends of the XFOV image a sequence of central image areas are matched together as shown by areas 51–56 in FIG. 3. In accordance with the principles of the present invention, as the successive image regions are aligned in their overlap regions to piece together the XFOV image, an error term is introduced into the displacement term used to match the regions to account for the distortion due to the interplay of the beam scanning direction and scanhead motion. This error term is proportional to the velocity of the moving scanhead, $V_{scanhead}$, divided by the beam scanning velocity $V_{beam}$. These terms are computed in the direction of scanhead motion as indicated by line 60 in FIG. 2b. Line 60 is seen to be in alignment with the direction of motion 14 in FIG. 1. This operation can be understood by the drawing of FIG. 4, where three image frames Fx, Fy, and Fz are being aligned. In this example the three frames are viewed edge-on (in profile) from the top or bottom. The starting frame Fx thus extends from a left edge $e_L$ to a right edge $e_R$, as do each of the other frames Fy and Fz. The frames are offset laterally from each other due to the different location of the moving scanhead at the time each was acquired. When the scanhead is moving from left to right, the offset proceeds in the same direction as the relative locations of frames Fx, Fy, and Fz illustrate. The displacement from one frame to another is calculated from the image data of each frame by any of a number of techniques known in the art. For example, the image data of successive frames can be aligned by correlating the data spatially to find the best alignment between the frames. Alternately, key features can be identified in the frames and the frames aligned by aligning the key features in overlapping frame areas. In a particular case this alignment processing might find the three frames to be spatially aligned as shown by the relative locations of the frames and their edges $e_L$ and $e_R$ as shown in FIG. 4. In the constructed embodiment the frames are then stored in the history buffer in alignment with each other as taught in the '345 patent.

In accordance with the principles of the present invention, the alignment of the image frames includes an error term, err, to account for lateral stretching or compression of the image due to the relative motion of the moving scanhead and the beam scanning sequence. For instance, FIG. 4 shows the aligned frames moved slightly to the left to account for a stretched condition. The err term results in each frame moved to a new position shown by alternate edges $e_L'$ and $e_R'$. In this manner the distortion due to stretching is accounted for in the alignment of the elemental frames in the production of the XFOV image, and a measurement across the XFOV image will be significantly more accurate than without this correction. This technique does not involve reprocessing or "warping" the entire image, but only the employment of a single correction factor during frame-to-frame alignment of the elemental frames.

Mathematically, calculation of the err term may proceed as follows. The acquisition of the XFOV image results in distance expansion or compression depending on the direction of scanhead movement relative to the sequence in which the ultrasound beams are emitted. Assuming the transducer element closest to the leading edge of the scanhead in motion fires first, the distance in the XFOV image will be expanded. Otherwise the distance appears to be compressed. The exact equation for the relative error (in %) is defined as $$err = \frac{V_s}{W}\left(\frac{1}{F_r} - T_d\right),$$

where $V_s$ is the speed of scanhead movement. W is the distance between the first and last beams along the transducer, $F_r$ is the frame, rate, and $T_d$ is the dead time between two successive frames. The error err may vary during a scan session if the scan speed during the session is not constant. However, this equation will be substantially accurate if the speed does not change greatly during the time forming each frame.

Standard XFOV image displacement computation. calculates the most recent frame position using the displacement parameters defined by $$M(dx, dy, k, \theta),$$

where the parameters dx,dy define translation of the two consecutive frames, and the parameter θ defines rotation.

The term k is a scaling coefficient. Two consecutive frames are related by these motion parameters as shown by the following matrix equation:

$$\begin{pmatrix} x(F_i) \\ y(F_i) \end{pmatrix} = k \begin{pmatrix} \cos\Theta & -\sin\Theta \\ \sin\Theta & \cos\Theta \end{pmatrix} \begin{pmatrix} x(F_{i-1}) \\ y(F_{i-1}) \end{pmatrix} + \begin{pmatrix} dx \\ dy \end{pmatrix}$$

where the F parameters are the frames with their time tag indices and x,y are position coordinates of a pixel in a frame. With the inventive technique the adaptive error correction for image distortion is done at the frame level, not the individual pixel or scanline level. Assuming the rotation during two consecutive frames is small, the corrected motion from the relative motion effect will be M(dx',dy',k, θ'), where $$dx' = dx \pm \frac{V_s}{W}\left(\frac{1}{F_r} - T_d\right),$$

dy' is equal to dy ± an error correction term Δy and θ' is a function of (θ,err, dx), such as $$\theta' = \arctan\left(\frac{\tan\theta}{1+\varepsilon}\right),$$

where ε=err/dx and $$err = \pm \frac{V_s}{W}\left(\frac{1}{F_r} - T_d\right).$$

The plus sign is used when the lateral dimension of an image expands because the elements fire in the order opposite to the scanhead motion direction. For the reverse relationship between the beam scanning and scanhead motion directions, the minus sign is used.

Figure 5:
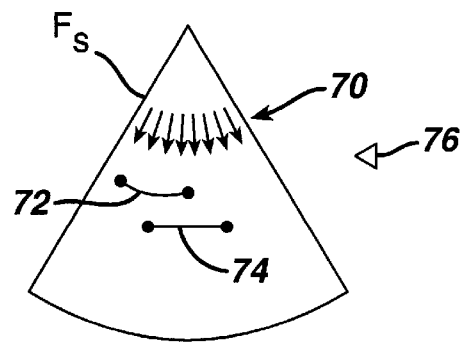
FIG. 5 illustrates a sector ultrasound image frame which is to be used in an extended field of view image.

The inventive technique can also be used with scanheads producing sector-shaped images as shown by image frame $F_s$ in FIG. 5, which may be produced by a phased array or a curved linear array scanhead. In a sector scan the beam scanning direction is not generally parallel to the direction of scanhead motion as is the case of: the linear scan sequence of FIG. 1. Instead, the beams are scanned in a radial, arcuate pattern as shown by beam directions 70 in FIG. 5. Thus, the direction of beam scanning is arcuate as indicated by curve 72, rather than in a straight line as shown by line 60 of FIG. 2b. Accurate error correction in this case would require calculation along the measurement path. The correction depends on the depth and angle of the end points in the image, The arcuate beam scanning direction introduces a further complication into the calculations, which may be done to compute a scanning speed generally parallel to the direction of scanhead motion as indicated by line 74, as by computing an average beam scanning factor in the direction of scanhead motion. The use of this approach is strengthened when only a central portion 50 of the sector is used in the XFOV image, as discussed above, since the beam scanning direction is substantially in the direction of scanhead motion in this area of the image. Additionally, when an average beam scanning speed is computed the depth at which the average is computed should also be considered, as the lateral beam scanning speed component is lower at the top of the image Fs (shallow depths) than at the bottom of the image (deeper depths).

The following calculation take these effects into consideration. Generally, the distortion error is a function of a few contributing factors:

$$err(i) = \gamma \cdot f(V_s, \theta, r, F_r, W_s)$$

The index i indicates that the error term is for ith frame. In a constructed embodiment, this calculation may take the form of $$err = \gamma \cdot f_1(V_s/W_s) \cdot f_2(r, R) \cdot f_3(\theta) \cdot \left(\frac{1}{F_r} - T_d\right)$$

when measuring a horizontal distance starting at the lateral center at depth r, where $f_1$, $f_2$, $f_3$ are functions, $V_s$ is the speed of scanhead movement (horizontally). $W_s$ is the distance between the first and last beams along the transducer in the direction of scanhead motion measured in arc length, $F_r$ is the frame rate, and $T_d$ is the dead time between two consecutive frames. The angle θ covers the extent of the horizontal distance of the image portion used that is not at the center. The radius R is the distance from the image apex to the center of the image and the radius r is the distance from the image apex to the center of the end of the measurement distance. The constant γ is a scaling coefficient.

Since the exact error depends on the location and geometry of the measured distance, an acceptable approximation is to compute an average over the measuring area, or to use a characteristic error at a certain beam angle and depth multiplied by the averaging area. The term $A = \Delta\theta \cdot R_c$ gives an area that evaluates the average. An adaptive approach is to perform the calculation for the depth indicated by a focal zone marker 76 for the image, on the assumption that the user has set the focal zone to be at the depth of the anatomy being scanned.

From the above and using the frame-to-frame translation and rotational factors mentioned in the linear scanning example, two consecutive frames can be related by the motion parameters with the following matrix equation:

$$\begin{pmatrix} x(F_i) \\ y(F_i) \end{pmatrix} = k \begin{pmatrix} \cos\Theta & -\sin\Theta \\ \sin\Theta & \cos\Theta \end{pmatrix} \begin{pmatrix} x(F_{i-1}) \\ y(F_{i-1}) \end{pmatrix} + \begin{pmatrix} dx \\ dy \end{pmatrix}$$

Assuming the rotation during two consecutive frames is small, the corrected displacement from the relative motion effect will be M(dx',dy',k, θ), where dx' =dx±err and dy'= dy±err. The distance parameters dx,dy are uncorrected translation displacement parameters originally estimated from the image content. The plus and minus signs are used as discussed above for the linear scanning example. A more general form of correction is the following:

$$dx' = E_{T_x}(dx, err),\ dy' = E_{T_y}(dx, dy, err),\ \text{and}\ \theta' = E_{T_z}(dx, \theta, err)$$

where $E_T()$ is a general translation correction function that modifies the first (translation) parameter with the second (error term).

The correction technique of the present invention may also be defined as a process for correcting distortion in an XFOV image. First, a common feature in successive, overlapping images is identified. From the different locations of the feature in the images, the displacement of the feature from one image to the next is computed using the known correlation or feature matching techniques. From knowledge of the difference in acquisition times of the two images, and by knowing the scaling of the images, the displacement term is used to compute the speed at which the scanhead is moving ($V_{scanhead}$) is computed in mm/sec. From knowledge of the beam scanning rate (PRF) and the interbeam spacing, and the direction of beam scanning, the beam scanning velocity ($\pm V_{beam}$) is computed, also in mm/sec. From these velocity terms a dimensionless correction factor is produced which is of the form:

$$\Delta D \propto \frac{V_{scanhead}}{V_{beam}}$$

where $\Delta D$ is the adjustment in the displacement from one image to the next which aligns the images while accounting for distortion due to relative scanhead-beam scanning motion.

The principles of the present invention may be extended to three dimensional XFOV imaging, in which case the displacement parameters are $M(dx, dy, dz, \theta_\alpha, \theta_\beta, \theta_\gamma)$.

The principles of the present invention may also be combined with the image warping technique of the prior art. For instance, an elemental image can be distortion corrected by warping, the warped image can be used to calculate the motion parameters to displace from one image frame to the next, and the unwarped, original images aligned by the motion parameters so determined to build up the XFOV image.

What is claimed is:

1. An ultrasonic diagnostic imaging system which produces extended field of view images comprising:
   a scanhead including an array transducer which transmits beams in a given sequence and produces a succession of component images exhibiting a lateral scanline spacing relative to a target which varies with scanhead motion as the scanhead is moved in a given direction in relation to the target;
   an extended field of view processor which aligns successive component images of the target which were acquired from different positions in relation to the target; and
   a display which displays an extended field of view image of aligned component images of the target exhibiting the lateral scanline spacing,
   wherein the successive images are aligned as a function of common image content of the images and the relationship of the beam scanning sequence to the motion of the scanhead.

2. The ultrasonic diagnostic imaging system of claim 1, further comprising an alignment processor which acts to determine the beam scanning sequence from the pulse repetition frequency of the beams and the direction in which the beams are scanned across the image field.

3. The ultrasonic diagnostic imaging system of claim 1, further comprising a motion processor which acts to determine the motion of the scanhead from the location of one or more anatomical features in successive images and the acquisition times of the images.

4. An ultrasonic diagnostic imaging system which produces extended field of view images comprising:
   a scanhead including an array transducer which transmits beams in a given sequence and produces a succession of component images as the scanhead is moved in a given direction in relation to a target, wherein the dimensions of the content of individual component images are distorted by the motion of the scanhead in relation to the sequencing of the transmit beams;
   an extended field of view processor which aligns successive component images of the target exhibiting the dimensions which were acquired from different positions in relation to the target; and
   a display which displays an extended field of view image of aligned component images of the target exhibiting the dimensions,
   wherein the successive component images are aligned as a function of the alignment of a common feature in the images and a distortion factor.

5. The ultrasonic diagnostic imaging system of claim 4, wherein the extended field of view processor aligns successive images by image data correlation.

6. The ultrasonic diagnostic imaging system of claim 4, further comprising a distortion factor calculator which calculates a distortion factor which is proportional to the speed of the scanhead motion and the speed of beam scanning across the image field.

7. The ultrasonic diagnostic imaging system of claim 6, wherein the distortion factor calculator acts to calculate a distortion factor which is proportional to the quotient of the speed of the scanhead motion and the speed of beam scanning across the image field.

8. The ultrasonic diagnostic imaging system of claim 4, wherein the array transducer comprises a linear array.

9. The ultrasonic diagnostic imaging system of claim 4, wherein the array transducer comprises a phased array.

10. The ultrasonic diagnostic imaging system of claim 4, wherein the array transducer comprises a curved array.

11. A method for producing an extended field of view ultrasonic image which is corrected for motional distortion comprising:
    acquiring a succession of component images of at Least partially common image content as a scanhead is translated in relation to a target, wherein the component images individually exhibit a lateral scanline spacing which has been stretched or compressed relative to the image field by scanhead motion;
    aligning successive component images on the basis of their common image content;
    adjusting the alignment of successive images on the basis of the motion of scanhead translation; and
    producing an extended field of view image of aligned successive component images which exhibit the individual lateral scanline spacing.

12. The method of claim 11, wherein aligning and adjusting are performed in a common computational step.

13. The method of claim 11, wherein aligning comprises aligning successive images by matching a common feature in successive images.

14. The method of claim 11, wherein aligning comprises aligning successive images by correlation of common image data in successive images.

15. The method of claim 11, wherein adjusting comprises adjusting the alignment of successive images on the basis of scanhead translation and beam scanning sequence of the scanhead.

16. The method of claim 15, wherein adjusting comprises adjusting the alignment of successive images on the basis of the direction and velocity of scanhead motion in relation to the direction and rate of beam scanning.

17. The method of claim 16, wherein adjusting comprises calculating displacement parameters based upon the position of an image frame in an XFOV image.

18. The method of claim 16, wherein adjusting comprises modifying displacement parameters by the addition or subtraction of an error correction term.

19. The method of claim 16, wherein adjusting comprises modifying displacement parameters with a correcting linear equation.

20. The method of claim 16, wherein adjusting comprises modifying displacement parameters with a correcting non-linear equation.

21. The method of claim 11, wherein acquiring comprises acquiring a succession of images with a linear array scanhead.

22. The method of claim 11, wherein acquiring comprises acquiring a succession of images with a phased array scanhead.

23. The method of claim 11, wherein acquiring comprises acquiring a succession of images with a curved array scanhead.

24. The method of claim 11, wherein adjusting comprises applying an error correction term to a displacement parameter which is in or opposite to the direction of scanhead movement.

25. The method of claim 24, wherein adjusting further comprises applying an error correction term which is a function of at least one of the tranducer movement speed, the distance between the first and last beams of an image, and the inverse of the frame rate.

26. The method of claim 24, wherein adjusting further comprises applying an error correction term which is a function of at least one of the tranducer movement speed, the inverse of the distance between the first and last beams of an image, the distance from the image apex to the transducer surface, the distance from a measuring point in the frame to the apex, the angle between the center line and a line between the apex and the measuring point, and the inverse of the frame rate.

27. The method of claim 11, wherein adjusting further comprises using a characteristic error correction term which represents an image area.

28. The method of claim 11, wherein adjusting further comprises using an averaged error term.

29. The method of claim 11, wherein adjusting further comprises using an adaptive error term.

* * * * *